United States Patent
Sirohi et al.

(10) Patent No.: US 10,606,833 B2
(45) Date of Patent: Mar. 31, 2020

(54) CONTEXT SENSITIVE INDEXES

(71) Applicant: Oracle International Corporation, Redwood Shores, CA (US)

(72) Inventors: Arjun K. Sirohi, Bellevue, WA (US); Dillip K. Praharaj, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 333 days.

(21) Appl. No.: 14/795,160

(22) Filed: Jul. 9, 2015

(65) Prior Publication Data
US 2016/0140178 A1 May 19, 2016

Related U.S. Application Data
(60) Provisional application No. 62/081,211, filed on Nov. 18, 2014.

(51) Int. Cl.
- *G06F 16/2453* (2019.01)
- *G06F 21/62* (2013.01)
- *G06F 16/22* (2019.01)

(52) U.S. Cl.
CPC .... *G06F 16/24542* (2019.01); *G06F 16/2272* (2019.01); *G06F 21/6227* (2013.01)

(58) Field of Classification Search
CPC .......... G06F 21/6227; G06F 17/30528; G06F 17/30474; G06F 17/30407; G06F 17/30336; G06F 16/24542; G06F 16/2272
See application file for complete search history.

(56) References Cited

U.S. PATENT DOCUMENTS

| | | | | |
|---|---|---|---|---|
| 6,938,044 | B1 * | 8/2005 | Milby | G06Q 20/145 |
| 8,166,071 | B1 * | 4/2012 | Korablev | G06F 21/6218 |
| | | | | 707/783 |
| 2003/0093408 | A1 | 5/2003 | Brown et al. | |
| 2003/0167255 | A1 | 9/2003 | GraBhoff et al. | |
| 2005/0131901 | A1 * | 6/2005 | Richter | G06F 21/604 |
| | | | | 707/10 |

(Continued)

OTHER PUBLICATIONS

Wikipedia, Data Definition Language, https://web.archive.org/web/20120215101940/https://en.wikipedia.org/wiki/Data_definition_language, Feb. 15, 2012, 5 pp. (Year: 2012).*

*Primary Examiner* — Marc S Somers
(74) *Attorney, Agent, or Firm* — Hickman Palermo Becker Bingham LLP

(57) ABSTRACT

Context-sensitive index visibility is used to reduce the number databases indexes that are considered and evaluated as an access path by query optimization. For a database statement that references or otherwise requires access to a set of database tables for which a DBMS defines a set of database indexes, context-sensitive index visibility limits the selection of database indexes. A query context comprises query context attributes, each of which is associated with a requested execution of a database statement. Query context attributes dictate whether a database index can be considered for query optimization. An example of a query context attribute is database user of a database session in which a database statement is issued. According to an embodiment of the present invention, a query context attribute is a session attribute stored as part of a session state of a database session.

18 Claims, 8 Drawing Sheets

(56) References Cited

U.S. PATENT DOCUMENTS

| | | | |
|---|---|---|---|
| 2006/0230035 A1 | 10/2006 | Bailey et al. | |
| 2007/0106638 A1* | 5/2007 | Subramaniam | G06F 17/30392 707/3 |
| 2008/0052266 A1 | 2/2008 | Goldstein et al. | |
| 2010/0125565 A1* | 5/2010 | Burger | G06F 16/24542 707/713 |
| 2011/0258199 A1* | 10/2011 | Oliver | G06F 17/3053 707/746 |
| 2011/0282864 A1* | 11/2011 | Collins | G06F 17/30445 707/719 |
| 2012/0221534 A1 | 8/2012 | Gao et al. | |
| 2014/0365527 A1* | 12/2014 | Fuchs | G06F 21/6227 707/786 |

\* cited by examiner

GRANT VISIBLE ON <INDEX_NAME> TO <USER>

202

REVOKE VISIBLE ON <INDEX_NAME> FROM <USER>

Visibility Schema 208

| USER/INDEX | Table1.idx1 | Table1.idx2 | Table1.idx3 | Table2.idx4 | Table2.idx5 |
|---|---|---|---|---|---|
| User1 | VISIBLE | VISIBLE | VISIBLE | VISIBLE | VISIBLE |
| User2 | VISIBLE | VISIBLE | VISIBLE | NOT VISIBLE | VISIBLE |
| User3 | NOT VISIBLE | VISIBLE | NOT VISIBLE | VISIBLE | VISIBLE |
| User4 | VISIBLE | VISIBLE | VISIBLE | NOT VISIBLE | VISIBLE |
| User5 | VISIBLE | NOT VISIBLE | NOT VISIBLE | VISIBLE | VISIBLE |
| User6 | VISIBLE | NOT VISIBLE | NOT VISIBLE | VISIBLE | VISIBLE |

210  GRANT VISIBLE ON Table1.idx1 TO User1

220  REVOKE VISIBLE ON Table2.idx4 FROM User2

FIG. 2B

310 CREATE MODULE <MODULE>

312 CREATE ACTION <ACTION> FOR <MODULE>

314 GRANT VISIBLE ON <INDEX NAME> TO <MODULE>[.<ACTION>]

316 REVOKE VISIBLE ON <INDEX NAME> TO <MODULE>[.<ACTION>]

FIG. 3

Visibility Schema 402

| MODULE ACTION/INDEX | Table1.idx1 | Table1.idx2 | Table1.idx3 | Table2.idx4 |
|---|---|---|---|---|
| Module1 | VISIBLE | VISIBLE | NOT VISIBLE | NOT VISIBLE |
| Module2 | VISIBLE | NOT VISIBLE | VISIBLE | NOT VISIBLE |
| Module1.Action1 | VISIBLE | VISIBLE | NOT VISIBLE | VISIBLE |
| Module1.Action2 | VISIBLE | VISIBLE | VISIBLE | NOT VISIBLE |
| Module2.Action3 | VISIBLE | NOT VISIBLE | VISIBLE | VISIBLE |
| Module2.Action4 | VISIBLE | VISIBLE | VISIBLE | NO VISIBLE |

FIG. 4

CONTEXT SENSITIVE INDEXES

RELATED APPLICATIONS

The present application claims priority to U.S. Provisional Application No. 62/081,211, entitled Context-Sensitive Indexes in RDBMS for Performance Optimization of SQL Queries in Multi-Tenant/Multi-Application Environments, filed by Arjun Sirohi and Dillip Praharaj on Nov. 18, 2014, the contents of which are incorporated herein by reference.

FIELD OF THE INVENTION

Embodiments of the present invention relate to Database Management Systems (DBMS), and in particular, to optimization of database statement execution involving indexes.

BACKGROUND

Relational and object-relational database management systems store information in tables of rows in a database. To retrieve data, queries that request data are submitted to a database server, which computes the queries and returns the data requested.

Queries submitted to the database server must conform to the syntactical rules of a particular database statement language. One popular database statement language, known as the Structured Query Language (SQL), provides users a variety of ways to specify information to be retrieved. There are many different versions of SQL, some versions are standard and some proprietary, and there are a variety of extensions.

A database statement submitted to a database server is evaluated by a query optimizer. Based on the evaluation, the query optimizer generates an execution plan that defines operations for executing the database statement. Typically, the query optimizer generates an execution plan optimized for efficient execution. Generating an execution plan optimized for execution is referred to herein as query optimization.

In query optimization, a DBMS may evaluate various ways of accessing the database to retrieve data needed to execute a database statement. Ways of accessing the database are referred to herein as access paths. An access path chosen by query optimization may significantly affect the speed of the retrieval and the amount of resources consumed executing the database statement. Many access paths involve a database index to increase the speed of the data retrieval process. Thus, query optimization involves evaluating the use of one or more database indexes for retrieving data needed to execute a database statement.

Query optimization involves evaluating various alternative ways of executing a database statement. Evaluating more alternatives is more costly in terms of computational time and resources. If all or too many alternatives are evaluated for a database statement, then the benefit of generating an efficient database statement would be offset or overcome by the cost of query optimization.

To limit the cost of query optimization, alternatives that are evaluated by query optimization are often limited to a subset of the possible space of alternatives, leaving other alternatives ignored and unevaluated. As a consequence, a suboptimal alternative for executing a database statement may be selected when an ignored alternative was more optimal. As the possible space of alternatives ways of executing a database statement increases, the likelihood of selecting an even lesser suboptimal alternative increases.

The number of alternative ways of executing a database statement increases as the number of database indexes and therefore number of access paths increases. Thus as the number of database indexes increases, the cost of determining an optimal alternative way of executing a database statement and/or the risk of selecting a lesser optimal alternative increase.

The number of database indexes that may be used for a database statement depends on several factors. These include the number of tables accessed by a database statement, and the number of database indexes that have been created for each of the tables accessed by the database statement.

Table and Index Proliferation in N-Tier Architectures

Many DBMS's are used in an N-tier architecture, in which a middleware tier generates and issues queries to a DBMS. As a result of and due to various limitations of such dynamic database statement generation by the middleware, the number of tables referenced in queries issued to DBMS's in N-tier architectures is becoming greater. In addition, the number of database indexes per table has also increased significantly due to the number and type of applications that use any given table in an N-tier architecture. For example, in the Oracle Fusion Applications, database statements dynamically generated by middleware reference 20 to 40 tables, many of which have a large number of indexes. As a result, the number of indexes that need to be considered and evaluated by query optimization has increased manifold.

Described herein are techniques for improving query optimization in the face of proliferation of database indexes.

BRIEF DESCRIPTION OF THE DRAWINGS

In the drawings:

FIG. 2A is a diagram depicting DDL statements that define index visibility for database indexes according to an embodiment of the present invention.

FIG. 2B is a diagram that depicts a visibility scheme for database indexes according to an embodiment of the present invention.

FIG. 3 is a diagram depicting DDL statements that define index visibility for database indexes according to an embodiment of the present invention.

FIG. 4 is a diagram that depicts a visibility scheme for database indexes according to an embodiment of the present invention.

DESCRIPTION OF EXAMPLE EMBODIMENTS

Overview

Described herein are approaches that may be used to reduce the number databases indexes that are considered and evaluated as an access path by query optimization of a database statement. The approach is referred to herein as context-sensitive index visibility. Specifically, for a database statement that references or otherwise requires access to a set of database tables for which a DBMS defines a set of database indexes, context-sensitive index visibility limits the selection of database indexes to evaluate based on a query context.

A query context comprises query context attributes, each of which is associated with a requested execution of a database statement. One or more query context attributes dictate whether a database index can be considered for query optimization, depending on the attribute state of the query context attribute. An example of a query context attribute is database user of a database session in which a database statement is issued. A database index that is selectable based on the query context of a database statement is referred to herein as visible.

According to an embodiment of the present invention, a query context attribute is a session attribute stored as part of a session state of a database session. The state of a session attribute is established when a database session is established for a user, or may be set by a database client while the database session is running.

A query context attribute that dictates whether a database index is visible is referred to herein as an "index visibility attribute" or "visibility attribute". According to an embodiment, a DBMS defines a visibility attribute for a database index, the visibility attribute dictating the "visibility" of the database index for execution of database statements.

An example of a useful visibility attribute is a database user associated with a database session. Only certain database indexes may be useful for particular database users and not other database users. Developers have knowledge of which database indexes may or may not be useful or optimal for various database users. Through data definition language ("DDL") statements issued to a DBMS, developers may define the database indexes as visible for the particular database users but not visible for other database users. To control visibility in this way, DDL statements are issued to a DBMS to define for a database user whether a database index is visible or not visible.

DBMS Overview

Figure 1A:
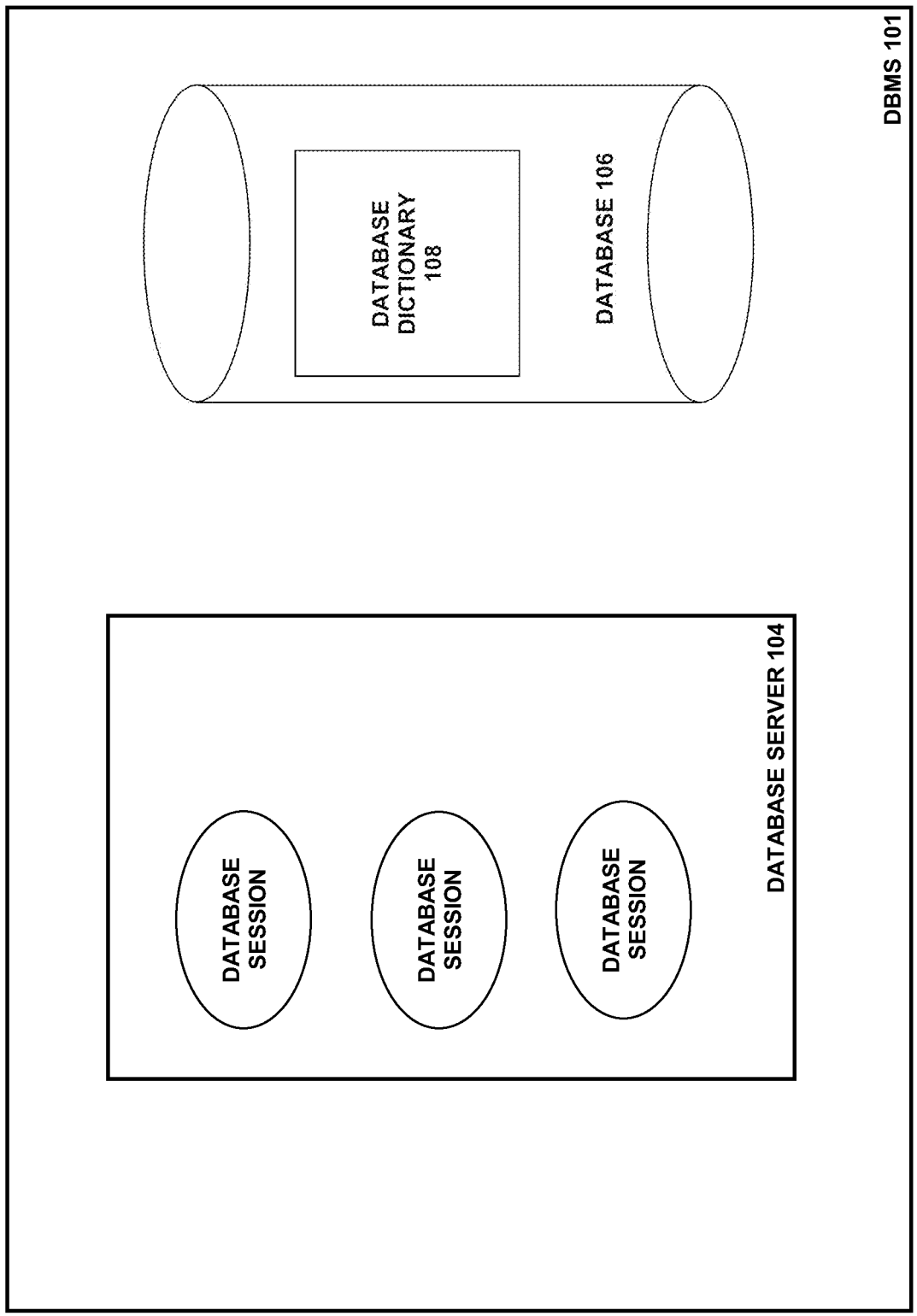
FIG. 1A is a diagram depicting a DBMS according to an embodiment of the present invention.

Embodiments of the present invention are used in the context of DBMS's. Therefore, a description of a DBMS is useful. FIG. 1A depicts an illustrative DBMS 101.

Referring to FIG. 1A, DBMS 101 manages database 106. A DBMS comprises database server 104, though DBMS's may comprise multiple database servers. Database 106 comprises database dictionary 108 and database data and that is stored on a persistent memory mechanism, such as a set of hard disks.

Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Data definition language ("DDL") statements are issued to a DBMS to create or configure database objects, such as tables, views, or complex data types, and database indexes. According to an embodiment of the present invention, a DDL statement may be issued to a DBMS to define a visibility attribute of a database index that dictates visibility of the database index.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

A DBMS is accessed by establishing a database session on a database server of the DBMS. A database session comprises a particular connection established for a database user to a database server, through which the client issues a series of requests (e.g., requests for execution of database statements).

Database 106 comprises database dictionary 108. A database dictionary is central to a DBMS's management of a database. A database dictionary contains metadata that defines database objects physically or logically contained in the database. Database objects include tables, columns, indexes, data types, database users, user privileges, and storage structures used for storing database object data, as well as logical database objects, such as schemas, applications, and modules. Modules and applications are explained in further detail below. The database dictionary is modified according to DDL commands issued to add, modify, or delete database objects.

Database Session

Figure 1B:
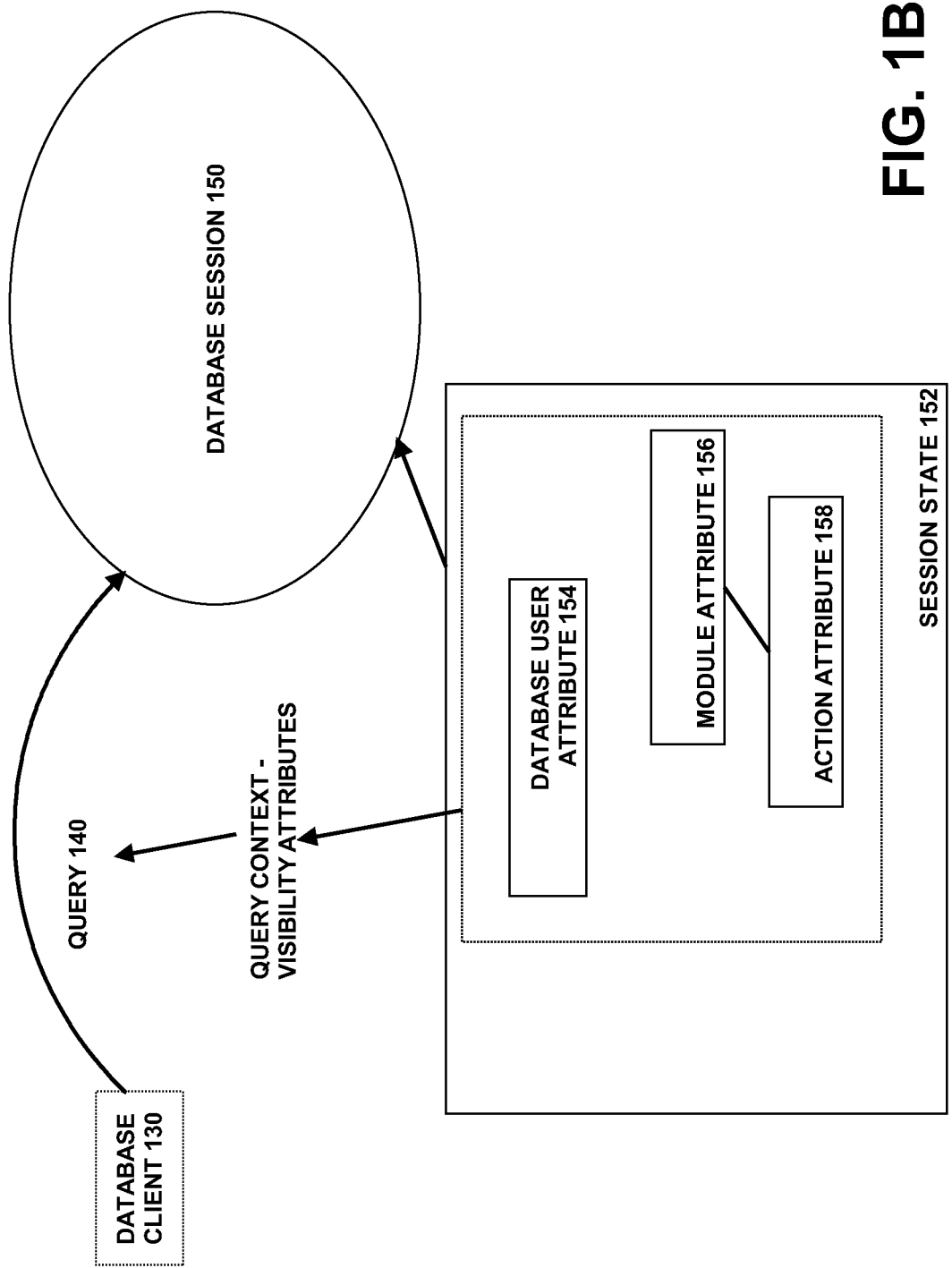
FIG. 1B is a diagram depicting a database session and session context attributes according to an embodiment of the present invention.

FIG. 1B depicts a database session on DBMS 101 according to an embodiment of the present invention. Referring to FIG. 1B, database session 150 is established for database client 130 in response to a connection request issued by database client 130.

Database server 104 maintains session state for a database session. The session state reflects the current state of the database session and may contain instances of object types, statistics about resource usage for the database session, temporary variable values generated by processes executing software within the database session, and storage for cursors and variables and other information.

A database user is a named database object, the name being referred to herein as a user name, and is associated by the DBMS with authenticating information and privileges for computer resources and database objects managed by the DBMS. The authenticating information is used by the DBMS to authenticate a connection request that presents a user name for the purposes of establishing a database session associated with the respective database user. If authentic, a database server grants the request and establishes a database session associated with the database user.

Among the privileges that may be associated with a database user by a DBMS are privileges to create database objects as an owner of the database objects, to access database objects owned by other database users, to perform particular kinds of DML operations of particular database objects, and modify the definition of database objects, and, importantly to define visibility for database indexes.

A database user may correspond to an individual human user, and/or correspond to a client application being executed by a database client. A client application may be programmed to use a particular set of database objects. Database users are used by developers to associate the particular set of database objects with a client application. For example, developers of a payroll application define a database user PAYROLL_USER and associate tables used by the payroll application by defining PAYROLL_USER as owner of the tables.

Session Attributes

Session state 152 includes the attribute state for session attributes. The state of session attributes is retained over multiple requests to execute database statements and/or over the life a database session. Information about a database user and privileges thereof is an example of the type of information stored in session attributes.

Some session attributes may be set by a database client by issuing a database statement within a database session. Other session attributes may not be set or altered by a database client but may be accessed in response to execution of database statements within a database session.

Various session attributes are depicted by FIG. 1B. Referring to FIG. 1B, session state includes session attributes database user attribute 154, module attribute 156, and action attribute 158. Database user attribute 154 may not be altered by a command issued by a database client, however, module attribute 156 and action attribute 158 may be.

The state of session attributes control how a DBMS behaves when executing database statements issued by a database client. Much of this behavior may be configured by developers and administrators. For example, an administrator may issue DDL statements to a DBMS to allow database sessions for a particular user to have access to a database object owned by another database user. When a database session issues a database statement referencing that database object, the DBMS checks the state of database user attribute 154 to determine whether the respective database user is the owner the database object or is one for which access is allowed.

Module attribute 156 and action attribute 158 allow the behavior of a DBMS to be controlled at a different level of granularity than the database user level. Module attribute 156 and action attribute 158 may be used by developers of client applications to specify within a database session a particular application and application related action associated with a request to execute a database statement within a database session. Developers may configure how a DBMS behaves for particular modules and/or actions by configuring the DBMS and programing client applications to set the module attribute 156 and action attribute 158 accordingly.

The attribute states of a session attribute may be restricted to a domain of states defined by a DBMS. For example, database user attribute 154 is only set to a database user registered or otherwise defined by a DBMS 101.

Module attribute 156 may only be set to states defined by DBMS 101. These states are defined by the DBMS in response to DDL statements that specify the states. A particular state or value that module attribute 156 may be set to is simply referred to herein as a module. The modules that a module attribute 156 may be set to are specified by DDL statements, which are described in further detail below.

Action attribute 158 may only be set to states defined by a DBMS. The states are defined by the DBMS in response to DDL statements that specify the states. A particular state or value that module attribute 156 may be set to is simply referred to herein as an action. The actions that action attribute 158 may be set to are specified by DDL statements, which are described in further detail below.

Context-sensitive Index Visibility

According to an embodiment, database index visibility may be controlled through session attributes database user attribute 154, module attribute 156, and action attribute 158. A DBMS may be configured, such that database user attribute 154, module attribute 156, and/or action attribute 158 are defined by the DBMS as visibility attributes for a specific database index.

Specifically, a DBMS may be configured in this way by issuing DDL statements to the DBMS. The DDL statements reference or otherwise identify a specific database index, a context attribute (e.g. session attribute) that is a visibility attribute for the database index, and an attribute state for the visibility attribute for which the visibility of the database index is either visible or not visible.

FIG. 2A illustrates DDL statements that may be issued to DBMS 101 to control visibility of database indexes based on database user attribute 154. Referring to FIG. 2A, it depicts grant-visibility DDL statement syntax 202 and revoke-visibility DDL statement syntax 204. Grant-visibility DDL statement syntax 202 is a syntax for DDL statements issued to a DBMS to define a database index <INDEX_NAME> as visible for a database user <USER>, where <INDEX_NAME> is an identifier that identifies a database index for a table and <USER> identifies a database user. For database sessions associated with database user <USER>, an index <INDEX_NAME> is visible when performing query optimization for a database statement issued in the database session.

Revoke-visibility DDL statement 204 syntax is a syntax for DDL statements issued to a DBMS to define a database index <INDEX_NAME> as not visible for a user <USER>, where <INDEX_NAME> is an identifier that identifies a database index for a table and <USER> identifies a database user. For database sessions of user <USER>, an index <INDEX_NAME> is not visible when performing query optimization for a database statement issued in the database session.

In an embodiment, by default a database index is VISIBLE for all users. The visibility of a database index may be selectively revoked for specific users. This approach is referred to herein as "visible by default."

FIG. 2B shows an illustrative declarative scheme for database index visibility at a database user level. Referring to FIG. 2B, it depicts visibility scheme 208, showing a visibility scheme for User1, User2, User3, User4, User5, and User6 for indexes Table1.idx1, Table1.idx2, Table1.idx3, Table2.idx4, and Table2.idx5. Table1.idx1, Table1.idx2, and Table1.idx3 are indexes on database table Table1 and Table2.idx4, and Table2.idx5 are indexes on database table Table2.

According to visibility scheme 208, for User1, Table1.idx1, Table1.idx2, Table1.idx3, Table2.idx4, and Table2.idx5 are VISIBLE. For User2, Table1.idx1, Table1.idx2, Table1.idx3 and Table2.idx5 are VISIBLE and Table2.idx4 is NOT VISIBLE.

For User1, the visibility for Table.idx1 may be set to VISIBLE by grant-visibility DDL statement 210. For User2, the visibility for Table.idx4 may be set to NOT VISIBLE by revoke-visibility DDL statement 220.

In the visible-by-default approach, the visibility of Table.idx1 (as well as the other indexes depicted in FIG. 2) for User1 is VISIBLE by default and would not need to have been established as such by grant-visibility DDL statement 210. For User2, similarly, the visibility of all indexes depicted in FIG. 2 are VISIBLE by default. Revoke-visibility DDL statement 220 is needed to set the visibility for Table.idx4 to NOT VISIBLE.

Visibility Attributes at the Module and Action Level

According to an embodiment of the present invention, visibility of a database index for a user may be controlled at a finer level granularity to provide for more robust control over when database indexes are visible. As mentioned previously, a database session may be associated with module session attribute and action session attribute set to a particular module.

The visibility of database indexes may be configured and controlled through the use DDL statements that are issued to a DBMS to cause the DBMS to define modules and actions, and to define visibility with respect to those modules and actions.

FIG. 3 depicts various DDL statements that may by used to define modules and actions. Referring to FIG. 3, it shows create module DDL statement syntax 310 and create action DDL statement syntax 312. Create module DDL statement syntax 310 is a syntax for DDL statements issued to a DBMS to define a module <MODULE>, where <MODULE> identifies a module.

According to an embodiment, each action is associated with a specific module. Thus, when defining an action, a module must be specified for the action. Create action DDL statement syntax 312 is a syntax for DDL statements issued to a DBMS to define an action <ACTION> for a module <MODULE>.

Grant-visibility DDL statement syntax 314 is a syntax for DDL statements issued to a DBMS to define a database index <INDEX_NAME> as VISIBLE for a module <MODULE> and/or action <ACTION>. Revoke-visibility DDL statement syntax 316 is a syntax for DDL statements issued to a DBMS to define a database index <INDEX_NAME> as NOT VISIBLE for a module <MODULE> and action <ACTION>. The brackets indicate that the <ACTION> is optional because visibility may be defined at the module level.

FIG. 4 shows an illustrative declarative scheme for module-action-level database index visibility involving modules and respective actions for each. Referring to FIG. 4, it depicts visibility scheme 402, showing a visibility scheme for modules Module1 and Module2, and for Module1, Action1 and Action2, and for Module2, Action3 and Action4.

As shown in FIG. 4, a visibility for a database index may be established for a user at the module level, thereby establishing a default for the module. The visibility for an action may override this default.

For example, for module Module1, the visibility of Table1.idx1 and Table1.idx2 is VISIBLE, while the visibility for Table1.idx3 and Table2.idx4 is NOT VISIBILE. For Action1 of Module1, the visibility of Table1.idx1, Table2.idx2, and Table1.idx3 is VISIBLE, and the visibility of Table2.idx4 is NOT VISIBLE.

The visibility defined for Action1 of Module1 overrides that defined for Module1. Note, if no visibility had been defined for Action1 of Module1, then the default visibility of Modules would be in effect.

Database Statement Execution Using Context-Sensitive Index Visibility

Figure 5:
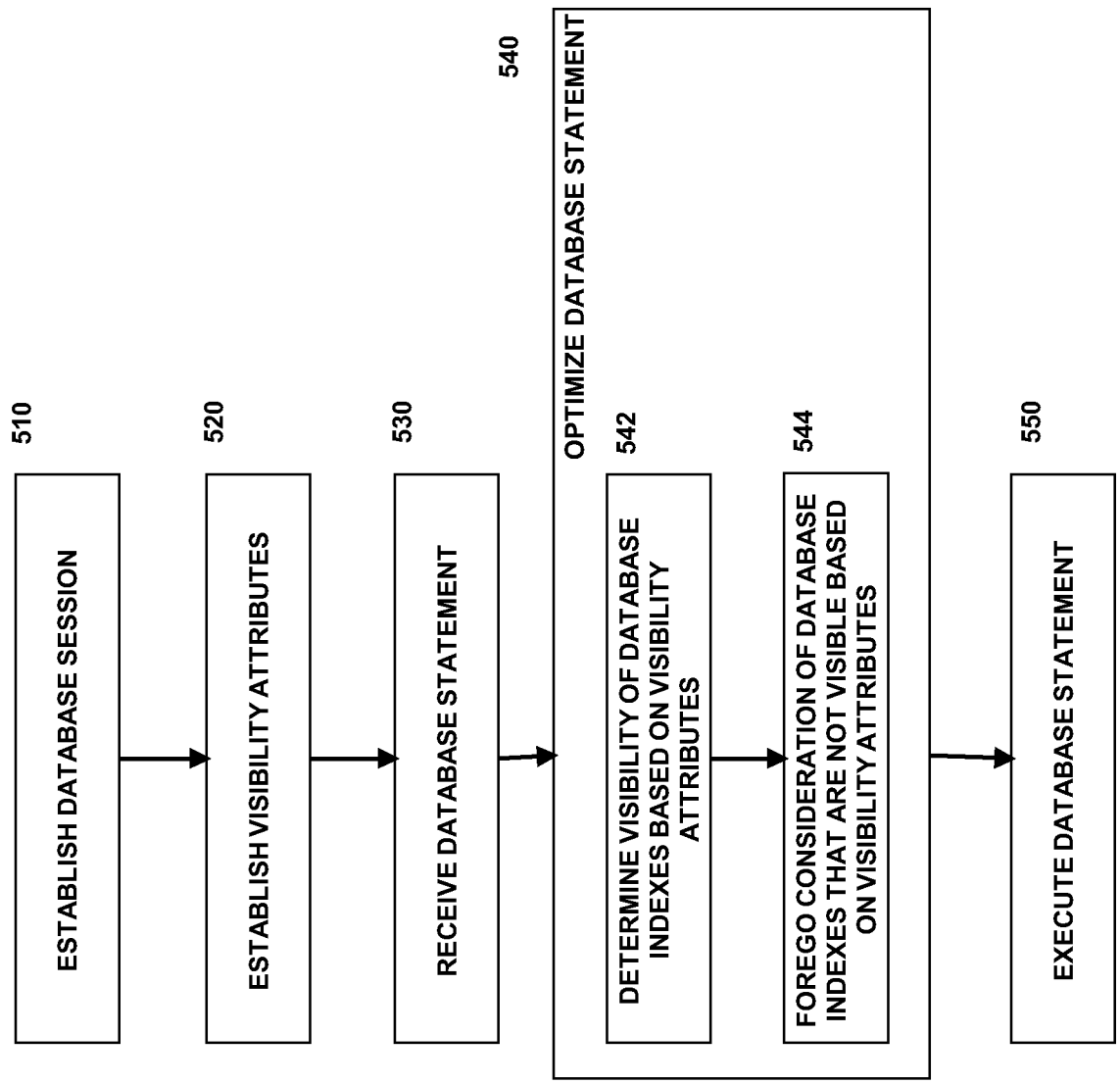
FIG. 5 depicts a process for executing a database statement that uses context-sensitive index visibility according to an embodiment of the present invention.

FIG. 5 depicts an overview for executing a database statement using context-sensitive index visibility. Operations of the overview are illustrated in the context of DBMS 101.

Referring to FIG. 5, at 510, a database session is established for a database user. The database session is established in response to a request from a database client to establish a database session.

At 520, visibility attributes are established. DBMS 101 may establish visibility attributes as part of establishing a database session or in conjunction with establishing the database session. As part of establishing database session 150, database user attribute 154 is set to identify the database user that was presented by the connection request.

Visibility attributes may by set by DBMS 101 in response to commands (e.g. database statements) issued by a database client 130. For example, database client 130 may send database statements to DBMS 101 to set the module attribute 156 to Module1 and the action attribute 158 to Action1.

At 530, DBMS 101 receives a database statement. At 540, DBMS 101 optimizes the database statement. This includes generating an optimized execution plan for the database statement.

Compiling and optimizing a database statement under context-sensitive index visibility not only involves aspects that are specific to context-sensitive index visibility but aspects that are more generally applicable to executing a database statement. For example, execution of a database statement under context-sensitive index visibility not only includes determining access paths for indexes based on visibility attributes but also other aspects that are not specific to context-sensitive index visibility, such as rewriting a database statement using various rewrite techniques, evaluating different join techniques, aggregation techniques, and dividing an execution plan into tasks that can be performed in parallel. For purposes of exposition of context-sensitive index visibility, more generally applicable aspects of compiling and optimizing a database statement are not described in as great as detail (if at all) as those aspects specific to context-sensitive index visibility.

At 542, DBMS 101 determines the visibility of database indexes of tables referenced and/or to which access is required to execute the database statement. Database indexes that are not visible based on visibility attributes are not considered for an access path. According to an embodiment, determining the visibility of a database index includes examining database dictionary 108 to determine the visibility attributes for the database index, determining the visibility specified by metadata in the database dictionary 108 for the attribute states of the visibility attributes, and whether those attribute states dictate that the database index is visible or not visible.

For example, a database statement may reference a column of Table1 in a WHERE clause predicate. The column is indexed by Table1.idx3. DBMS 101 examines metadata in database dictionary 108 to determine that visibility attributes for database index Table1.idx3 include session attributes module attribute 156 and action attribute 158. The attribute state of module attribute 156 is Module1 and of action attribute 158 is Action1. Database dictionary 108 specifies that when module attribute 156 is set to Module1 and action attribute 158 is set to Action1, that Table1.idx3 is not visible.

At 544, DBMS forgoes considering as for access path any database indexes determined not be visible at 542, and generates an execution plan accordingly. At 550, DBMS 550 executes the execution plan.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
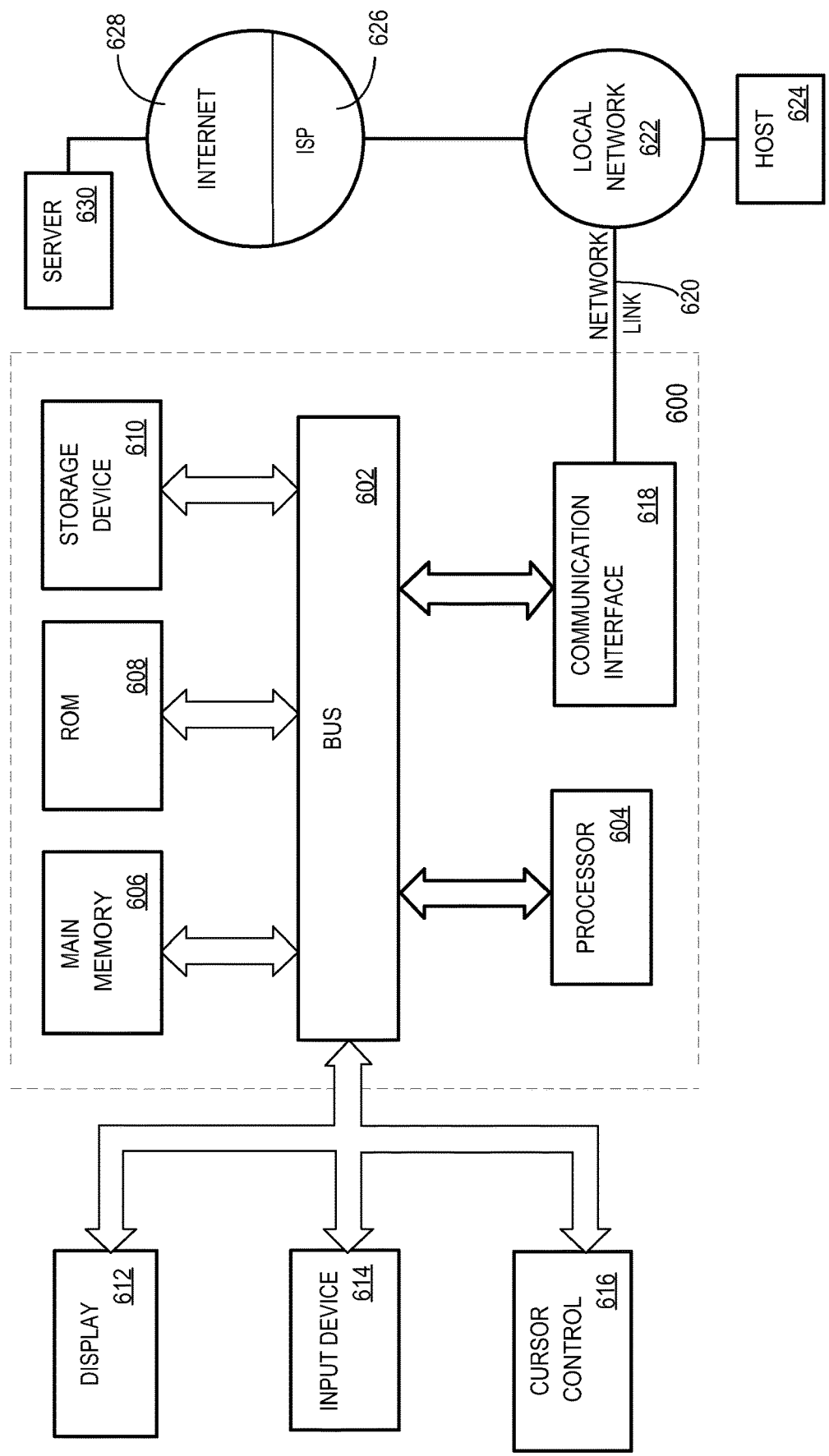
FIG. 6 is a diagram depicting a computer system that may be used to implement an embodiment of the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   a database management system ("DBMS") receiving one or more data definition language ("DDL") database statements;
   in response to receiving said one or more DDL statements, generating within a database dictionary of said DBMS, dictionary metadata that defines:
      multiple database indexes on a table, said multiple database indexes including a first database index and a second database index, said first database index indexing a particular column of said table;
      a first domain of first attribute states for a first visibility attribute, said first domain of first attribute states including a first visibility attribute state,
      for said first visibility attribute state, defining a second domain of second attribute states for a second visibility attribute associated with said first visibility attribute state, said second domain of second attribute states including a second visibility attribute state,
      that said first database index and said second database index are visible by default for said first visibility attribute state, and
      that said first database index is not visible for said second visibility attribute state; and
   establishing a database session, wherein establishing a database session includes setting, within said database session, at least one user attribute that grants access to said table;
   said DBMS receiving a particular database statement within said database session, wherein said particular database statement references said table and said particular column in a WHERE clause;
   before receiving said particular database statement:
      setting within said database session said first visibility attribute to said first visibility attribute state;
      setting within said database session said second visibility attribute to said second visibility attribute state;
   within said database session, compiling said particular database statement thereby generating an execution plan for said particular database statement, wherein generating an execution plan includes:
      making a determination that said dictionary metadata defines said first visibility attribute and said second visibility attribute as visibility attributes for said first database index and said second database index;
      making a determination that said dictionary metadata defines that said first database index is not visible when said second visibility attribute is set to said second visibility attribute state;
      in response to making a determination that said dictionary metadata defines that said first database index is not visible when said second visibility attribute is set to said second visibility attribute state, foregoing evaluating said first database index for use as an access path for said execution plan to said table in response to said determination, and
      evaluating said second database index for use as an access path for said execution plan to said table; and
   said DBMS executing said execution plan.

2. The method of claim 1, further including receiving second one or more DDL database statements specifying, for said second visibility attribute, another visibility attribute state for which said first database index is not visible.

3. The method of claim 1, wherein setting within said database session said first visibility attribute includes setting said first visibility attribute in response to establishing said database session.

4. The method of claim 1, wherein setting within said database session said first visibility attribute includes setting said first visibility attribute in response to receiving a command from a database client.

5. The method of claim 1, wherein:
   establishing said database session includes setting a session attribute to identify a database user;
   the method further includes:
      receiving a request from a database client to set said first visibility attribute to said first visibility attribute state; and
      performing said setting within said database session said first visibility attribute in response to receiving said request.

6. The method of claim 1, wherein:
   said second domain of said second attribute states include another visibility attribute state for which said first database index is visible.

7. The method of claim 1, wherein a third visibility attribute of said database session identifies a database user.

8. The method of claim 1, wherein said first visibility attribute state identifies a module.

9. The method of claim 1, wherein said second visibility attribute state identifies an action.

10. One or more non-transitory storage media storing sequences of instructions which, when executed by one or more computing devices, cause:

a database management system ("DBMS") receiving one or more data definition language ("DDL") database statements;

in response to receiving said one or more DDL statements, generating within a database dictionary of said DBMS, dictionary metadata that defines:

multiple database indexes on a table, said multiple database indexes including a first database index and a second database index, said first database index indexing a particular column of said table;

a first domain of first attribute states for a first visibility attribute, said first domain of first attribute states including a first visibility attribute state, for said first visibility attribute state, defining a second domain of second attribute states for a second visibility attribute associated with said first visibility attribute state, said second domain of second attribute states including a second visibility attribute state, that said first database index and said second database index are visible by default for said first visibility attribute state, and that said first database index is not visible for said second visibility attribute state; and establishing a database session, wherein establishing a database session includes setting, within said database session, at least one user attribute that grants access to said table;

said DBMS receiving a particular database statement within said database session, wherein said particular database statement references said table and said particular column in a WHERE clause;

before receiving said particular database statement:
setting within said database session said first visibility attribute to said first visibility attribute state;
setting within said database session said second visibility attribute to said second visibility attribute state;

within said database session, compiling said particular database statement thereby generating an execution plan for said particular database statement, wherein generating an execution plan includes:

making a determination that said dictionary metadata defines said first visibility attribute and said second visibility attribute as visibility attributes for said first database index and said second database index;

making a determination that said dictionary metadata defines that said first database index is not visible when said second visibility attribute is set to said second visibility attribute state;

in response to making a determination that said dictionary metadata defines that said first database index is not visible when said second visibility attribute is set to said second visibility attribute state, foregoing evaluating said first database index for use as an access path for said execution plan to said table in response to said determination, and evaluating said second database index for use as an access path for said execution plan to said table; and said DBMS executing said execution plan.

11. The one or more non-transitory storage media of claim 10, wherein the sequences of instructions comprise instructions, which when executed by said one or more computing devices, cause receiving second one or more DDL database statements specifying, for said second visibility attribute, another visibility attribute state for which said first database index is not visible.

12. The one or more non-transitory storage media of claim 10, wherein setting within said database session said first visibility attribute includes setting said first visibility attribute in response to establishing said database session.

13. The one or more non-transitory storage media of claim 10, wherein setting within said database session said first visibility attribute includes setting said first visibility attribute in response to receiving a command from a database client.

14. The one or more non-transitory storage media of claim 10, wherein:

establishing said database session includes setting a session attribute to identify a database user;

the sequences of instructions comprise instructions, which when executed by said one or more computing devices, cause:

receiving a request from a database client to set said first visibility attribute to said first visibility attribute state; and performing said setting within said database session said first visibility attribute in response to receiving said request.

15. The one or more non-transitory storage media of claim 10, wherein:

said second domain of said second attribute states include another visibility attribute state for which said first database index is visible.

16. The one or more non-transitory storage media of claim 10, wherein a third visibility attribute of said database session identifies a database user.

17. The one or more non-transitory storage media of claim 10, wherein said first visibility attribute state identifies a module.

18. The one or more non-transitory storage media of claim 10, wherein said second visibility attribute state identifies an action.

* * * * *